United States Patent
Kanezaki et al.

(10) Patent No.: US 10,174,881 B2
(45) Date of Patent: Jan. 8, 2019

(54) PRESSURE TANK

(71) Applicant: HONDA MOTOR CO., LTD., Tokyo (JP)

(72) Inventors: Toshihiko Kanezaki, Wako (JP); Hideo Watanabe, Wako (JP); Satoshi Kawasaki, Wako (JP); Tadahisa Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/458,975

(22) Filed: Mar. 15, 2017

(65) Prior Publication Data

US 2017/0268724 A1 Sep. 21, 2017

(30) Foreign Application Priority Data

Mar. 15, 2016 (JP) .................................. 2016-050690

(51) Int. Cl.
*F17C 1/04* (2006.01)

(52) U.S. Cl.
CPC ........ *F17C 1/04* (2013.01); *F17C 2201/0104* (2013.01); *F17C 2203/0604* (2013.01); *F17C 2203/066* (2013.01); *F17C 2209/228* (2013.01); *F17C 2221/012* (2013.01)

(58) Field of Classification Search
CPC ...................................................... F17C 1/04
USPC ............ 220/585, 586, 62.22, 62.11, 560.12, 220/560.04; 206/0.6
See application file for complete search history.

(56) References Cited

U.S. PATENT DOCUMENTS

| | | | | |
|---|---|---|---|---|
| 2,989,208 A * | 6/1961 | Gibbs, Jr. | ............. | B65D 15/06 220/254.2 |
| 4,360,116 A * | 11/1982 | Humphrey | ............... | F17C 1/16 220/560.04 |
| 5,551,590 A * | 9/1996 | Mazur | .................... | F24H 9/124 220/23.83 |
| 5,651,473 A * | 7/1997 | Preston | ................. | F17C 13/001 220/560.1 |
| 6,230,922 B1 * | 5/2001 | Rasche | ..................... | F17C 1/16 220/586 |
| 6,542,848 B1 * | 4/2003 | Neeser | .................. | F17C 13/025 700/281 |

(Continued)

FOREIGN PATENT DOCUMENTS

| | | | | |
|---|---|---|---|---|
| CA | 2361339 A1 * | 8/2000 | ................ | F17C 1/00 |
| DE | 19631546 C1 * | 11/1997 | ................ | F17C 1/16 |

(Continued)

OTHER PUBLICATIONS

Japanese Office Action for corresponding JP Application No. 2016-050690, dated Dec. 26, 2017 (w/ English machine translation).

*Primary Examiner* — Robert J Hicks
(74) *Attorney, Agent, or Firm* — Mori & Ward, LLP (57) ABSTRACT

A pressure tank includes a resin liner, a base, a seal, and a collar. The resin liner contains fluid therein. The resin liner has a tubular portion via which an inside of the resin liner communicates with an outside of the resin liner. The base includes a supply/discharge hole in which the tubular portion is inserted. The seal is provided between the tubular portion and the base in the supply/discharge hole. The collar has a through-hole and inserted into the tubular portion.

20 Claims, 2 Drawing Sheets

(56) References Cited

U.S. PATENT DOCUMENTS

| | | | | |
|---|---|---|---|---|
| 7,870,971 B2* | 1/2011 | Schlag | .................... | B29C 41/04 |
| | | | | 220/585 |
| 9,261,239 B2* | 2/2016 | Kanezaki | ................... | F17C 1/04 |
| 2009/0107570 A1* | 4/2009 | Weber | ....................... | F17C 1/16 |
| | | | | 138/30 |
| 2012/0205337 A1* | 8/2012 | Holbach | ................ | F17C 13/06 |
| | | | | 215/40 |
| 2013/0069321 A1* | 3/2013 | Miura | .................... | F16J 15/166 |
| | | | | 277/638 |
| 2014/0103051 A1* | 4/2014 | Kanezaki | ............. | F17C 13/002 |
| | | | | 220/587 |
| 2014/0247689 A1* | 9/2014 | Wang | ....................... | A23L 2/54 |
| | | | | 366/348 |
| 2015/0140247 A1* | 5/2015 | Shibutani | ................ | C08L 27/18 |
| | | | | 428/36.91 |
| 2015/0292679 A1* | 10/2015 | Ehgartner | ............... | F17C 13/06 |
| | | | | 220/581 |

FOREIGN PATENT DOCUMENTS

| | | | | |
|---|---|---|---|---|
| EP | 0753700 A1 * | 1/1997 | ........... | B29C 53/602 |
| JP | 2013-520622 | 6/2013 | | |
| JP | 2013-137092 | 7/2013 | | |
| JP | 2015-031307 | 2/2015 | | |
| WO | WO 2015/114953 | 8/2015 | | |

* cited by examiner

PRESSURE TANK

CROSS-REFERENCE TO RELATED APPLICATIONS

The present application claims priority under 35 U. S. C. § 119 to Japanese Patent Application No. 2016-050690, filed Mar. 15, 2016. The contents of this application are incorporated herein by reference in their entirety.

BACKGROUND OF THE INVENTION

Field of the Invention
The present invention relates to a pressure tank.
Discussion of the Background
The high pressure tank is widely used as a container for containing fluid such as gas, liquid, and the like. For example, the high pressure tank is mounted on fuel cell vehicle for containing hydrogen gas in order to supply to fuel battery system.

This kind of high pressure tank has a liner configuring an outer surface covered with a reinforcing layer made of fiber reinforced plastic and a resin hollow body. A hollow tubular portion is formed and projected on the liner. A base on which a supply/discharge hole is formed for supplying/discharging fluid to the inside of the liner is installed to the tubular portion. A valve is provided on the supply/discharge hole. The supply/discharge hole is opened and closed by operating the valve.

It is common that the high pressure tank seals between the liner and the base with a seal member. For example, it is mentioned in Japanese Laid-Open Patent Publication No. 2015-31307 that according to the configuration that the tubular portion is inserted into the base, a seal member attached to an outer peripheral surface of the base can seal between the outer peripheral surface and an inner peripheral surface of the tubular portion. However, in the configuration, the internal pressure of fluid may expand the tubular portion to the separating direction from the seal member. Moreover, it is supposed that the inner peripheral surface of the tubular portion causes shrinkage deformation by creep due to the fact that the liner is made of resin material. If such a situation happens, the distance (seal gap) between the inner peripheral surface of the tubular portion and the outer peripheral surface of the base is increased, which makes difficult to gain a sufficient sealability.

For example, as mentioned in Japanese Laid-Open Patent Publication No. 2013-137092, on the contrary to the above-mentioned configuration, the other is a possible configuration that the tubular portion is arranged inside the supply/discharge hole of the base, the seal member is interposed between the outer surface of the tubular portion and the inner surface of the supply/discharge hole. In the case, the seal member is attached to the inner peripheral surface of the base, and simultaneously, the internal pressure is applied to the direction that the tubular portion is pressed to the seal member side. Accordingly, the tubular portion presses and abuts on the base and the so-called self-seal structure is formed, which can maintain a seal gap approximately constant and can favorably seal the space between the tubular portion and the base.

Moreover, according to the configuration, the pressure of fluid is applied from the tip surface side to the tubular portion, if the strength of the tubular portion is insufficient, the tubular portion is easily separated from the base. Moreover, if the shrinkage deformation of the tubular portion is generated due to temperature drop, creep, and the like, the seal gap is increased, finally which leads to the degradation in sealability. In order to prevent these, the liner mentioned in Japanese Laid-Open Patent Publication No. 2013-137092 enhances the strength of the tubular portion due to the fact that the metal reinforcement is buried inside the tip surface of the tubular portion.

SUMMARY OF THE INVENTION

According to a first aspect of the present invention, a pressure tank characterized in that the pressure tank which has a resin liner containing fluid and a base on which a supply/discharge hole formed for supplying/discharging fluid to a liner. The liner has a tubular portion on which an insertion hole is formed, and simultaneously which is inserted into the supply/discharge hole. Moreover, the liner has a seal member sealing the space between an outer peripheral surface of the tubular portion and the inner peripheral surface of the supply/discharge hole. A collar sandwiches the tubular portion with the outer peripheral surface of the portion inserted into the insertion hole and the inner peripheral surface of the supply/discharge hole, simultaneously, on which a through-hole communicated with the supply/discharge hole is formed.

According to a second aspect of the present invention, a pressure tank includes a resin liner, a base, a seal, and a collar. The resin liner contains fluid therein. The resin liner has a tubular portion via which an inside of the resin liner communicates with an outside of the resin liner. The base includes a supply/discharge hole in which the tubular portion is inserted. The seal is provided between the tubular portion and the base in the supply/discharge hole. The collar has a through-hole and inserted into the tubular portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Hereinafter, the preferable embodiment for the high pressure tank related to the present embodiment will be shown and will be explained in detail with reference to the attached drawings.

For example, the high pressure tank related to the present embodiment can be favorably used as a container mounted on a fuel cell vehicle and containing hydrogen gas for being supplied to the fuel battery system. Then, the present embodiment explains an example in which the high pressure tank contains hydrogen gas as fluid for being supplied to the fuel battery system. However, the embodiment is not particularly limited to this. The high pressure tank related to the present embodiment can contain fluid except hydrogen gas.

Figure 1:
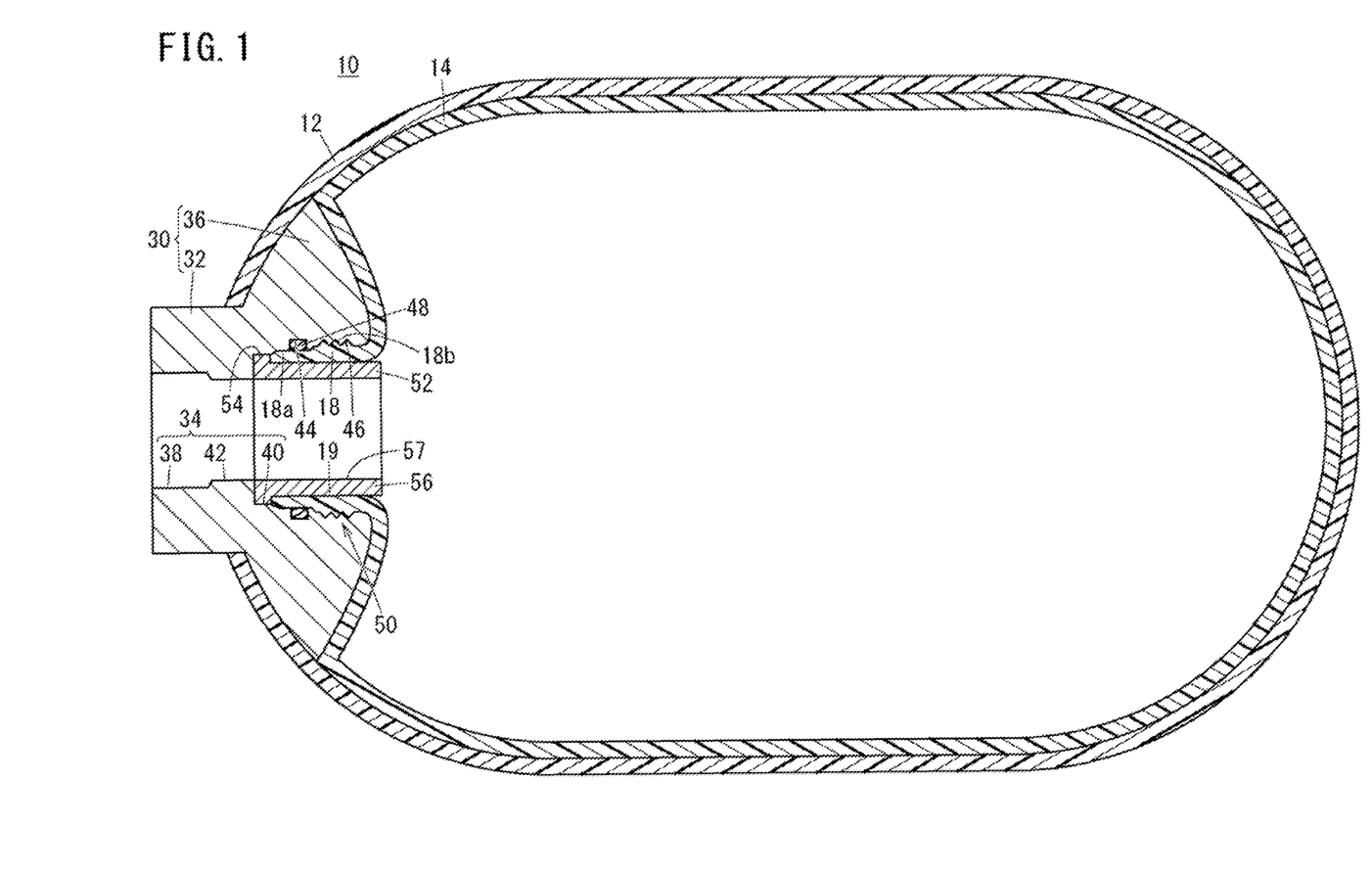
FIG. 1 is a generally and schematically sectional view parallel to the longitudinal direction of the high pressure tank according to the embodiment in the present invention.

As shown in FIG. 1, the high pressure tank 10 related to the present embodiment contains hydrogen gas in the hollow inside of the liner 14 which has the outer periphery covered with the reinforcing layer 12 made of fiber reinforced plastic. The liner 14 is made of a plurality of resin layers, the tubular portion 18 is formed and projected on the one end portion which is once oriented to the inside and recessed. Moreover, as below, the surface facing to the hollow inside of the liner 14 side is called as the inner surface, and the back surface (exposed surface) is called as the outer surface.

Figure 2:
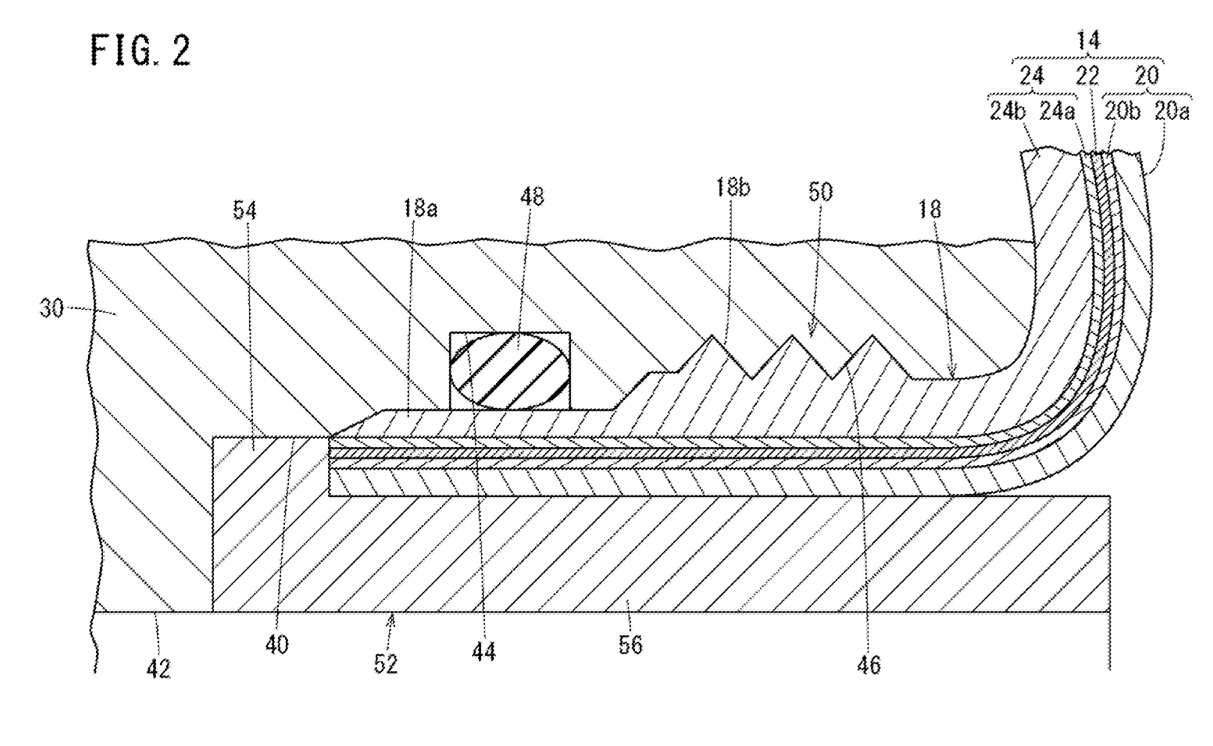
FIG. 2 is an enlarged sectional view in the opening side of the high pressure tank shown in FIG. 1.

As shown in FIG. 2, the plurality of resin layers of the liner 14 are mainly configured with an inside layer 20, a barrier layer 22, and an outside layer 24, and are layered in the order heading from the inner surface side to the outer surface side of the liner 14. The inside layer 20 comprises the two layers which are an innermost layer 20a configured with the inner surface of the liner 14, and a first adhesive layer 20b interposed between the innermost layer 20a and the barrier layer 22. The outside layer 24 comprises a second adhesive layer 24a layered on the barrier layer 22, and an outermost layer 24b configuring the outer surface of the liner 14.

For example, the barrier layer 22 is configured with materials which are sufficiently low in permeation of hydrogen gas, such as ethylene-vinyl alcohol copolymer (EVOH) resin and the like. The innermost layer 20a and the outermost layer 24b are made of high density polyethylene (HDPE) resin, and protects the barrier layer 22.

It is preferable to adopt polyethylene resin, especially preferable to adopt low density polyethylene (LDPE) resin for the first adhesive layer 20b and the second adhesive layer 24a. The first adhesive layer 20b and the second adhesive layer 24a seal between the innermost layer 20a and the barrier layer 22, and between the barrier layer 22 and the outermost layer 24b, respectively. As for the liner 14 with this configuration, the barrier layer 22 blocks the diffusion of hydrogen molecules entered into the inside layer 20 to the outside layer 24, and the diffusion of hydrogen molecules which are entered into the outside layer 24 to the inside layer 20.

The thickness of the liner 14 including all of the above-mentioned resin layers is set as more than 1 mm, which enables to gain the rigidity required for manufacturing the liner 14 and assembling the high pressure tank 10.

The tubular portion 18 is a hollow part on which the insertion hole 19 communicated with the hollow inside, a thin portion 18a is provided on the tip side, and an external thread 18b is formed in further base end side than the thin portion 18a. The thin portion 18a is a thinner part than the other parts. It is preferable that the thickness of the thin portion 18a is set as more than 1 mm so as to gain sufficient rigidity as mentioned above. Moreover, when the thickness of the outside layer 24 of the thin portion 18a is set as X, it is preferable that the following relational expression (1) is established.

$$0<X\leq 29\sqrt{D} \qquad (1)$$

D is the diffusion coefficient of the outside layer obtained by the differential pressure method at 50° C.

The reason will be explained as below. If $T_c$ is set as the time during which hydrogen gas filled in the high pressure tank 10 starts to be decompressed and the crack is generated on the outside layer 24, and if $L_c$ is set as the moving distance that hydrogen molecules moves inside the outside layer 24 during the time $T_c$, the below-mentioned relational expression (2) is established between $L_c$ and $T_c$ according to Fick's laws of diffusion.

$$L_c = k\sqrt{DT_c} \qquad (2)$$

K is a proportional constant. Moreover, D is a diffusion coefficient of materials obtained by the differential pressure method at 50° C.

The detail explanation is omitted due to the fact that the differential pressure method is common knowledge.

If the thickness X is larger than the moving distance $L_c$, the state is maintained such that hydrogen molecules enter into the outside layer 24 when hydrogen gas is discharged from the high pressure tank 10 (when the high pressure tank 10 is decompressed). Meanwhile, if the moving distance $L_c$ is less than the thickness X, hydrogen molecules can be separated from the outside layer 24 when the high pressure tank 10 is decompressed. Accordingly, it is not likely to generate cracks because hydrogen molecules can move the same distance as the thickness X or the longer distance than that. Therefore, the thickness X is set larger than 0 and less than $L_c$. Namely, the following relational expression (3) is established.

$$0 < X \leq L_c \qquad (3)$$

In the relational expression (2), the proportional constant K is a fixed value. Moreover, $T_c$ remains unchanged, or the change is in a negligible degree. Namely, K and $T_c$ in the relational expression (2) are considered as fixed values. Then, as shown in a relational expression (4), the product of K and $T_c^{1/2}$ is set as a constant K.

$$K = k\sqrt{T_c} \qquad (4)$$

The relational expressions (2), (4) are determined from the following relational expression (5).

$$L_c = k\sqrt{D} \qquad (5)$$

Moreover, the thickness of the second adhesive layer 24a configuring the outside layer 24 is so small as to be negligible, compared to the thickness of the outermost layer 24b. Accordingly, as explained below, the thickness of the outermost layer 24b may be set as the thickness X of the outside layer 24.

Next, for example, test pieces of the liner 14 are prepared as the test pieces with the thickness X of the outside layer 24 in 0.3 mm, 1.0 mm, 3.0 mm, 4.0 mm, 5.0 mm. Moreover, these test pieces are produced in the same way except the difference in the thickness X of the outside layers 24, and has the barrier layer 22 which is made of EVOH resin, the innermost layer 20a and the outermost layer 24b which are made of HDPE resin, and the first adhesive layer 20b and the second adhesive layer 24a which are made of HDPE resin.

Each test piece was evaluated whether cracks were generated by the decompression to a predetermined pressure after still standing in the pressurized hydrogen gas atmosphere at 50° C. Specifically, the test pieces through the above-mentioned process were cut parallel to the thickness direction, and were checked the existence of cracks by observing the cross section.

As a result, it was confirmed that cracks were not generated when the thickness X was set below 1.0 mm, and cracks were generated when the thickness X was set more than 3.0 mm. This matched to the result which evaluated the existence of cracks when the test pieces which were made of only the outermost layer 24b were produced. According to the test result based on the above-mentioned result, when the moving distance $L_c$ is 1.5 mm, it is not likely to generate cracks due to the fact that hydrogen molecules can be separated from the outside layer 24.

Meanwhile, the diffusion coefficient D of HDPE is gained as $2.7 \times 10^{-9}$ m²/second, according to the differential pressure method at 50° C. K is calculated as K=29 by substituting the value and $L_c$=1.5 mm into the relational expression (5). As mentioned above, the thickness X is set below $L_c$. Accordingly, the thickness may be set below $29 \times D^{1/2}$. Therefore, as for the thickness X of the outside layer 24, the above-mentioned relational expression (1) is established from the relational expression (3) and the relational expression (5).

As mentioned above, when the inside of the high pressure tank 10 is decompressed by setting the thickness of the outside layer 24 of the thin layer portion 18a as the above mentioned range, the hydrogen molecules entered into the outside layer 24 of the thin layer portion 18a can be easily discharged to the outside. Namely, the hydrogen molecules can be suppressed to stay inside the outside layer 24 of the thin layer portion 18a, which enables to avoid generating cracks and blisters (swelling).

As shown in FIG. 1, the base 30 is externally mounted on the tubular portion 18. For example, the base 30 is made of metal. The supply/discharge hole 34 is formed parallel to an axial center of a cylindrical projecting portion 32. Moreover, the base 30 has a shoulder portion 36 spreading in a disk shape from a base end of a projecting portion 32, the outer peripheral surface of the shoulder portion 36 as well as the liner 14 are covered with the reinforcing layer 12. Therefore, the base 30 is configured such that the shoulder portion 36 is covered with the liner 14 and the reinforcing layer 12, and the projecting portion 32 has a projecting shape so as to be exposed from the opening of the reinforcing layer 12.

The outer diameter of the projecting portion 32 is approximately constant. Meanwhile, the inner diameter of the supply/discharge hole 34 varies depending on the parts. Specifically, the supply/discharge hole 34 comprises a medium inner diameter portion 38 positioned on the projecting portion 32 side, a large inner diameter portion 40 positioned on the shoulder portion 36 side, a small inner diameter portion 42 provided between the medium inner diameter portion 38 and the large inner diameter portion 40. The medium inner diameter portion 38 is configured such that a high pressure hose is connected through a valve so as to be removable (both are not shown).

The tubular portion 18 is inserted into the large inner diameter portion 40. Accordingly, the outer peripheral surface of the tubular portion 18 is arranged so as to be parallel to the inner peripheral surface of the large inner diameter portion 40. Therefore, the inner diameter of the large inner diameter portion 40 is set as a size corresponding to the outer diameter of the tubular portion 18. The inner diameter of the part facing to the thin portion 18a is smaller than the inner diameter of the part facing to the base end side of the thin portion 18a. Moreover, an annular groove 44 which is parallel to the peripheral direction of the large inner diameter portion 40 is formed at the part facing to the thin portion 18a of the tubular portion 18 on the inner wall of the large inner diameter portion 40. A female screw 46 which is screwed with the external thread 18b is formed on the part facing to the external thread 18b of the tubular portion 18.

A seal member 48 made of O-ring is arranged inside the groove 44. Namely, the thin portion 18a includes the part facing to at least the seal member 48 of the liner 14.

As shown in FIG. 2, the distance (seal gap) between the inner wall surface of the groove 44 and the outside layer 24 is set so as to maintain the state such that the seal member 48 is compressed between the inner wall surface of the groove 44 and the outside layer 24 of the thin portion 18a. Accordingly, it is possible to seal the space between the outer peripheral surface of the tubular portion 18 and the inner peripheral surface of the supply/discharge hole 34 of the base 30.

Moreover, the joint portion 50 is formed so as to join the outer peripheral surface of the tubular portion 18 and the inner peripheral surface of the large inner diameter portion 40 by screwing the external thread 18b with the female screw 46. The joint portion 50 is arranged in further base end side of the tubular portion 18 than the seal member 48.

Furthermore, the collar 52 is arranged inside the large inner diameter portion 40 so as to support the tubular portion 18. For example, the collar 52 is made of metal and has a head portion 54 in an annular shape, and a cylindrical portion 56 which is integrally provided with the head portion 54 in a cylindrical shape. A through-hole 57 is formed from the head portion 54 to the cylindrical portion 56 on the collar 52.

A one end surface of the head portion 54 abuts on a height difference surface formed between the small inner diameter portion 42 of supply/discharge hole 34 and the large inner diameter portion 40. The other end surface abuts on the tip surface of the tubular portion 18. Moreover, the peripheral surface of the head portion 54 abuts on the inner peripheral surface of the large inner diameter portion 40. The cylindrical portion 56 is inserted into the insertion hole 19 of the tubular portion 18. Then, the through-hole 57 is communicated with the supply/discharge hole 34.

Accordingly, the collar 52 is arranged such that the outer peripheral surface of the cylindrical portion 56 is arranged so as to revolve parallel to the inner peripheral surface of the large inner diameter portion 40 through the tubular portion 18. Namely, the tubular portion 18 is sandwiched with the outer peripheral surface of the cylindrical portion 56 of the collar 52, and the inner peripheral surface of the large inner diameter portion 40 (supply/discharge hole 34). The cylindrical portion 56 directs and presses the tubular portion 18 to the inner peripheral surface side of the large inner diameter portion 40, the outer peripheral surface of the tubular portion 18 is pressed on the inner peripheral surface of the large inner diameter portion 40. Moreover, it is preferable that cylindrical portion 56 is press-fitted into the tubular portion 18 from the view point so as to favorably sandwich the tubular portion 18.

Moreover, it is preferable that the linear expansion coefficient of the collar 52 is set below the linear expansion coefficient of the base 30. In order to set the linear expansion coefficient as the above-mentioned relation, for example, the collar 52 is made from iron, the base 30 is made of aluminum alloy. In the case, even if the collar 52 and the base 30 are inflated corresponding to the temperature rise and the like, the tubular portion 18 can prevent from being excessively pressed between the cylindrical portion 56 and the large inner diameter portion 40.

The high pressure tank 10 related to the present embodiment is basically configured as mentioned above. The high pressure tank can easily gain the liner 14 by applying the well-known blow-molding method. Moreover, the collar 52 is simply configured with only the head portion 54 and the cylindrical portion 56, which enables to be easily attached to the large inner diameter portion 40 and the tubular portion 18.

Moreover, as mentioned above, a high pressure hose is connected to the medium inner diameter portion 38 of the base 30 in the high pressure tank 10. Accordingly, hydrogen gas is supplied from a hydrogen supplying source (not shown) to the inside of the liner 14 through the high pressure hose, the supply/discharge hole 34 and the through-hole 57.

Accordingly, hydrogen gas contained in the liner 14 is dischargeable through the opening/closing valve attached to the medium inner diameter portion 38 and supplied to the piping and the like (any of them are not shown) connected to the fuel battery system.

Despite of the repetition of supplying/discharging hydrogen gas, the high pressure tank 10 related to the present embodiment has the superior durability and sealability with the simple configuration which can maintain the seal gap between the liner 14 and the base 30 constant.

Namely, as mentioned above, in the high pressure tank 10, the cylindrical tubular portion 18 is arranged parallel to the inner peripheral surface of the large inner diameter portion 40, and the seal member 48 is arranged between the outer peripheral surface of the tubular portion 18 and the inner peripheral surface of the large inner diameter portion 40. Accordingly, the internal pressure of hydrogen gas is applied to the direction that the tubular portion 18 is pressed to the seal member 48 side. Therefore, the so-called self-seal structure is formed. As a result, if a high internal pressure is applied, the seal gap can be maintained constant, and can be favorably sealed the space.

Moreover, as mentioned above, the tubular portion 18 is sandwiched with the cylindrical portion 56 of the collar 52 and the inner peripheral surface of the large inner diameter portion 40. Accordingly, even if the pressure of fluid is applied from the tip surface side to the tubular portion 18, the tubular portion can be suppressed to be separated from the inner peripheral surface of the large inner diameter portion 40. Moreover, the shrinkage deformation due to temperature drop, creep, and the like is suppressed, which can favorably maintain the seal gap.

The collar 52 is simply configured as mentioned above, which can prevent the configuration from complicating and so on such that the collar 52 is buried into the wall of the tubular portion 18. Moreover, the edge portion of the collar 52 does not abut on the tubular portion 18 (the liner 14). Accordingly, the tubular portion 18 can avoid the stress concentration and the generation of the fatigue damage and the like.

Moreover, the linear expansion coefficient of the collar 52 is set below the linear expansion coefficient of the base 30. Therefore, when the temperature drop occurs and the collar 52 and the base 30 are shrunk, the shrinkage amount of the collar 52 is smaller. Accordingly, in the case, the collar 52 presses the tubular portion 18 to the base 30 side. Therefore, the seal gap is maintained and the sealability is kept.

Moreover, at the time of the temperature rise, the inflation of the collar 52 is comparably smaller than the base 30. Therefore, the inflated collar 52 prevents the pressure thereof to the tubular portion 18 from becoming excessively larger. Accordingly, the tubular portion 18 can avoid the deformation by receiving the pressing force of the inflated collar 52.

Then, any of further tip side than the seal member 48 of the tubular portion 18 including the end surface, the inner peripheral surface, and the outer peripheral surface is exposed to hydrogen gas. Compared to further rear end side than the seal member 48, hydrogen molecules can easily enter the inside. If hydrogen molecules enter and stay the inside of the tubular portion 18, cracks and blisters (swelling) may be generated.

However, in the high pressure tank 10 related to the present embodiment, as mentioned above, the joint portion 50 joining the outer peripheral surface of the tubular portion 18 and the inner peripheral surface of the large inner diameter portion 40 is arranged in further base end side than the seal member 48. Accordingly, hydrogen molecules can be suppressed to enter the part configuring the joint portion 50 of the tubular portion 18, which can favorably maintain the joint state by the joint portion 50.

Moreover, the thickness X of the outside layer 24 of the thin portion 18a is set within the above-mentioned range so as to face to the seal member 48 and form the seal gap between the inner wall surface of the groove 44 and the outside layer. Accordingly, even if hydrogen molecules enter into the outside layer 24, hydrogen molecules can be easily separated from the outside layer 24 at the time of the decompression inside the high pressure tank 10. Accordingly, in spite of the repetition of supplying/discharging hydrogen gas in the high pressure tank 10, hydrogen molecules can avoid staying inside the outside layer 24 of the thin portion 18a. Therefore, the generation of cracks and blisters on the part forming the seal gap of the tubular portion 18 can be especially and efficiently suppressed, which can favorably maintain the seal gap. As a result, the durability and the sealability of the high pressure tank 10 can be favorably improved furthermore.

The present invention is not specifically limited to the above-mentioned embodiment and various modifications are possible within the scope of the invention.

In the high pressure tank 10 related to the above-mentioned embodiment, the joint portion 50 joining the outer peripheral surface of the tubular portion 18 and the inner peripheral surface of the large inner diameter portion 40 is formed by screwing the external thread 18b of the tubular portion 18 with the female screw 46 of the large inner diameter portion 40. However, the present embodiment is not limited to this. For example, the joint portion may be formed such that the outer peripheral surface of the tubular portion 18 and the inner peripheral surface of the large inner diameter portion 40 are adhered by the adhesive agent. As mentioned above, in the case, hydrogen molecules can be suppressed to enter the part configuring the joint portion of the tubular portion 18, which can favorably maintain the joint state by the joint portion.

As for the high pressure tank related to the present embodiment, the tubular portion of the liner is arranged parallel to the inner peripheral surface of the supply/discharge hole of the base, and the seal member is arranged between the outer peripheral surface of the tubular portion and the inner peripheral surface of the supply/discharge hole. Accordingly, due to the fact that the internal pressure of fluid is applied to the direction that the tubular portion is pressed to the seal member side, the so-called self-seal structure is formed. As a result, if a high internal pressure is applied, it is possible to maintain the distance (the seal gap) between the outer peripheral surface of the tubular portion and the inner peripheral surface of the base which sandwiches the seal member constant, and to favorably seal the gap. Moreover, the liner which has an above-mentioned tubular portion can be easily formed by blow molding, and is excellent in assembling property with the base.

Moreover, the tubular portion is sandwiched with a collar outer peripheral surface and the inner peripheral surface of the supply/discharge hole. Accordingly, if the fluid pressure is applied from the tip surface side, the tubular portion is suppressed to be separated from the inner peripheral surface of the supply/discharge hole. Moreover, if the shrinkage deformation due to temperature drop, creep, and the like is generated on the tubular portion, the collar is pressed to and abutted on the tubular portion, which can maintain to sandwich the tubular portion with the collar and the base. Accordingly, the seal gap can be favorably maintained.

In addition, the collar is simply configured so as to be provided parallel to the inner peripheral surface side of the insertion hole, which can prevent the configuration from complicating and so on such that the collar is buried into the wall of the tubular portion. Moreover, the caller can be easily assembled with the base and the tubular portion.

As mentioned above, the high pressure tank related to the present embodiment has the superior durability and sealability with the simple configuration which can maintain the seal gap between the liner and the base constant.

It is preferable that the linear expansion coefficient of the collar is set below the linear expansion coefficient of the base in the above-mentioned high pressure tank. In the case, the shrinkage of the collar is comparably smaller than the base at the time of the temperature drop. Accordingly, if the collar and the base are shrunk, the collar presses the tubular portion to the base side. Accordingly, due to the fact that the seal gap is maintained, the sealability of the high pressure tank is maintained.

At the time of temperature rise, the inflation of the collar is comparably smaller than the base. Therefore, the deformation caused by the inflated collar excessively pressing the tubular portion can be avoided.

It is preferable that a joint portion provided in further base end side of the tubular portion than the seal member joins the outer peripheral surface of the tubular portion and the inner peripheral surface of the supply/discharge hole in the above-mentioned high pressure tank. If the fluid is set as hydrogen gas having a relatively small molecular weight, any of further tip end side than the seal member of the tubular portion including the end surface, the inner peripheral surface, and the outer peripheral surface, is exposed to the fluid. The hydrogen molecules easily enter the inside, compared to further rear end side than the seal member. If hydrogen molecules enter the inside of the tubular portion, cracks and blisters (swelling) may be generated.

As mentioned above, the joint portion is provided in further base end side of the tubular portion than the seal member, which can suppress hydrogen molecules to enter to the part configuring the joint portion of the tubular portion. Accordingly, in spite of the repetition of supplying/discharging the fluid through a supply/discharge hole, it is possible to maintain the state that the outer peripheral surface of the tubular portion and the inner peripheral surface of the supply/discharge hole are favorably jointed. Namely, the durability of the high pressure tank can be improved furthermore.

In the above-mentioned high pressure tank, the fluid is a hydrogen gas, the liner is made of a plurality of resin layers, the plurality of resin layers have at least a barrier layer preventing the permeation of hydrogen gas, and an outside layer arranged in further outer periphery side of the tubular portion than the barrier layer, the part of the liner facing to at least the seal member has a total thickness of the plurality of resin layers which is more than 1 mm, and it is preferable that the following relational expression (1) is established when the thickness of the outside layer is set as X.

$$0 < X \leq 29\sqrt{D} \quad (1)$$

D is the diffusion coefficient of the outside layer obtained by the differential pressure method at 50° C.

When the inside of the high pressure tank is decompressed by setting the thickness of the part of the outside layer facing to at least the seal member as the above-mentioned area, the hydrogen entered into the part can be easily discharged to the outside. Accordingly, hydrogen can be suppressed to stay inside the portion facing to at least the seal member of the outside layer, and can avoid generating cracks and blisters on the part. As a result, in spite of the repetition of supplying/discharging the fluid through a supply/discharge hole, the seal gap can be favorably maintained, which can favorably improve the durability and the sealability of the high pressure tank furthermore.

The high pressure tank in the present embodiment can perform the superior durability and the sealability with a simple configuration which can maintain the seal gap between the liner and the base constant.

Obviously, numerous modifications and variations of the present invention are possible in light of the above teachings. It is therefore to be understood that within the scope of the appended claims, the invention may be practiced otherwise than as specifically described herein.

What is claimed is:

1. A pressure tank characterized in that the pressure tank has a resin liner containing fluid and a base on which a supply/discharge hole is formed for supplying/discharging fluid to said liner,
   said liner has a tubular portion on which an insertion hole is formed, the tubular portion is inserted into said supply/discharge hole,
   said liner has a seal member sealing the space between an outer peripheral surface of said tubular portion and an inner peripheral surface of said supply/discharge hole,
   a collar which sandwiches said tubular portion with the outer peripheral surface of the portion inserted into said insertion hole and the inner peripheral surface of said supply/discharge hole, simultaneously, on which a through-hole communicated with said supply/discharge hole is formed, and
   a joint portion is provided on said outer peripheral surface of said tubular portion of said liner, said joint portion being in direct contact with said inner peripheral surface of said supply/discharge hole to join said tubular portion of said liner to said supply/discharge hole of said base,
   wherein the supply/discharge hole has a small inner diameter portion and a large inner diameter portion, the small inner diameter portion being located closer to an outermost opening of the supply/discharge hole than the large inner diameter portion,
   wherein the collar is provided within the large inner diameter portion so as to abut a surface of the base formed between the small inner diameter portion and the large inner diameter portion, and
   wherein the through-hole of the collar has an inner diameter that matches with an inner diameter of the small inner diameter portion of the supply/discharge hole such that the through-hole of the collar and the small inner diameter portion of the supply/discharge hole are continuous in an axial direction of the liner.

2. The pressure tank according to claim 1, the pressure tank characterized in that a linear expansion coefficient of said collar is set below a linear expansion coefficient of said base.

3. The pressure tank according to claim 1, the pressure tank characterized in that the joint portion is provided closer to a base end side of said tubular portion than said seal member.

4. The pressure tank according to claim 1, the pressure tank characterized in that
   said fluid is a hydrogen gas,
   said liner is made of a plurality of resin layers,
   said plurality of resin layers have at least a barrier layer preventing hydrogen gas from permeating and an outside layer arranged in further outer periphery side of said tubular portion than said barrier layer, a part of said liner facing to at least said seal member has a total thickness of said plurality of resin layers which is more than 1 mm, and the following relational expression (1) is established when the thickness of said outside layer is set as X, $$0 < X \leq 29\sqrt{D} \quad (1)$$

D is the diffusion coefficient of the outside layer obtained by a differential pressure method at 50° C.

5. The pressure tank according to claim 1, wherein said joint portion includes external threads provided on said outer peripheral surface.

6. The pressure tank according to claim 1, wherein said joint portion includes an adhesive agent provided on said outer peripheral surface.

7. The pressure tank according to claim 1,
wherein said supply/discharge hole has an outermost opening, and
wherein said collar is recessed within said supply/discharge hole, and said collar is spaced apart from the outermost opening of said supply/discharge hole.

8. The pressure tank according to claim 1,
wherein the collar includes a head portion and a cylindrical portion, the head portion having a larger outside diameter than the cylindrical portion, the head portion being provided closer to the outermost opening of the supply/discharge hole than the cylindrical portion, an axial end surface of the head portion abutting the surface of the base formed between the small inner diameter portion and the large inner diameter portion.

9. A pressure tank comprising:
a resin liner to contain fluid therein, the resin liner having a tubular portion via which an inside of the resin liner communicates with an outside of the resin liner;
a base including a supply/discharge hole in which the tubular portion is inserted;
a seal provided between the tubular portion and the base in the supply/discharge hole; and
a collar having a through-hole and inserted into the tubular portion,
wherein the tubular portion of the resin liner has an outer peripheral surface with a joint portion, the joint portion being in direct contact with an inner peripheral surface of the supply/discharge hole to join the tubular portion of the resin liner to the supply/discharge hole of the base,
wherein the supply/discharge hole has a small inner diameter portion and a large inner diameter portion, the small inner diameter portion being located closer to an outermost opening of the supply/discharge hole than the large inner diameter portion,
wherein the collar is provided within the large inner diameter portion so as to abut a surface of the base formed between the small inner diameter portion and the large inner diameter portion, and
wherein the through-hole of the collar has an inner diameter that matches with an inner diameter of the small inner diameter portion of the supply/discharge hole such that the through-hole of the collar and the small inner diameter portion of the supply/discharge hole are continuous in an axial direction of the resin liner.

10. The pressure tank according to claim 9, wherein a linear expansion coefficient of the collar is set below a linear expansion coefficient of the base.

11. The pressure tank according to claim 9, wherein the joint portion is provided closer to a base end side of the tubular portion than the seal.

12. The pressure tank according to claim 9, wherein
the fluid is a hydrogen gas,
the resin liner is made of a plurality of resin layers,
the plurality of resin layers have at least a barrier layer preventing the hydrogen gas from permeating and an outside layer arranged in further outer periphery side of the tubular portion than the barrier layer,
a part of the resin liner facing to at least the seal has a total thickness of the plurality of resin layers which is more than 1 mm, and a following relational expression (1) is established when a thickness of the outside layer is set as X, $$0 < X \leq 29\sqrt{D} \quad (1)$$

D is a diffusion coefficient of the outside layer obtained by a differential pressure method at 50° C.

13. The pressure tank according to claim 9, wherein the joint portion includes external threads provided on the outer peripheral surface.

14. The pressure tank according to claim 9, wherein the joint portion includes an adhesive agent provided on the outer peripheral surface.

15. The pressure tank according to claim 9,
wherein the supply/discharge hole has an outermost opening, and
wherein the collar is recessed within the supply/discharge hole, and the collar is spaced apart from the outermost opening of the supply/discharge hole.

16. The pressure tank according to claim 9,
wherein the collar includes a head portion and a cylindrical portion, the head portion having a larger outside diameter than the cylindrical portion, the head portion being provided closer to the outermost opening of the supply/discharge hole than the cylindrical portion, an axial end surface of the head portion abutting the surface of the base formed between the small inner diameter portion and the large inner diameter portion.

17. A pressure tank comprising:
a resin liner to contain fluid therein, the resin liner having a tubular portion via which an inside of the resin liner communicates with an outside of the resin liner;
a base including a supply/discharge hole in which the tubular portion is inserted, the supply/discharge hole having an outermost opening;
a seal provided between the tubular portion and the base in the supply/discharge hole; and
a collar having a through-hole and inserted into the tubular portion,
wherein the collar is recessed within the supply/discharge hole, and the collar is spaced apart from the outermost opening of the supply/discharge hole,
wherein the tubular portion of the resin liner has an outer peripheral surface with a joint portion, the joint portion being in contact with an inner peripheral surface of the supply/discharge hole to join the tubular portion of the resin liner to the supply/discharge hole of the base,
wherein the joint portion is provided closer to an innermost side of the tubular portion than the seal,
wherein the supply/discharge hole has a small inner diameter portion and a large inner diameter portion, the small inner diameter portion being located closer to the outermost opening of the supply/discharge hole than the large inner diameter portion, wherein the collar is provided within the large inner diameter portion so as to abut a surface of the base formed between the small inner diameter portion and the large inner diameter portion, and wherein the through-hole of the collar has an inner diameter that matches with an inner diameter of the small inner diameter portion of the supply/discharge hole such that the through-hole of the collar and the small inner diameter portion of the supply/discharge hole are continuous in an axial direction of the resin liner.

18. The pressure tank according to claim 17, wherein a linear expansion coefficient of the collar is set below a linear expansion coefficient of the base.

19. The pressure tank according to claim 17, wherein the fluid is a hydrogen gas, the resin liner is made of a plurality of resin layers, the plurality of resin layers have at least a barrier layer preventing the hydrogen gas from permeating and an outside layer arranged in further outer periphery side of the tubular portion than the barrier layer, a part of the resin liner facing to at least the seal has a total thickness of the plurality of resin layers which is more than 1 mm, and a following relational expression (1) is established when a thickness of the outside layer is set as X, $$0 < X \leq 29\sqrt{d} \qquad (1)$$

D is a diffusion coefficient of the outside layer obtained by a differential pressure method at 50° C.

20. The pressure tank according to claim 17, wherein the collar includes a head portion and a cylindrical portion, the head portion having a larger outside diameter than the cylindrical portion, the head portion being provided closer to the outermost opening of the supply/discharge hole than the cylindrical portion, an axial end surface of the head portion abutting the surface of the base formed between the small inner diameter portion and the large inner diameter portion.

* * * * *